(12) United States Patent
Rao et al.

(10) Patent No.: US 7,895,270 B2
(45) Date of Patent: *Feb. 22, 2011

(54) TRANSPORT ABSTRACTION FOR MULTIPARTY REPLICATION

(75) Inventors: Ravi T. Rao, Redmond, WA (US); Scott A. Senkeresty, Duvall, WA (US); Cesare J. Saretto, Bellevue, WA (US); John S. Holmes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1479 days.

This patent is subject to a terminal disclaimer.

(21) Appl. No.: 11/267,439

(22) Filed: Nov. 4, 2005

(65) Prior Publication Data

US 2006/0239297 A1 Oct. 26, 2006

Related U.S. Application Data

(63) Continuation-in-part of application No. 11/111,532, filed on Apr. 21, 2005.

(51) Int. Cl.
G06F 15/16 (2006.01)
(52) U.S. Cl. .................................... 709/205; 370/401
(58) Field of Classification Search ................ 709/204, 709/205
See application file for complete search history.

(56) References Cited

U.S. PATENT DOCUMENTS

| | | | |
|---|---|---|---|
| 6,549,937 B1 * | 4/2003 | Auerbach et al. | 709/206 |
| 7,054,867 B2 * | 5/2006 | Bosley et al. | 1/1 |
| 7,590,632 B1 * | 9/2009 | Caronni et al. | 1/1 |
| 2002/0143989 A1 * | 10/2002 | Huitema et al. | 709/243 |
| 2003/0009546 A1 * | 1/2003 | Benfield et al. | 709/223 |
| 2004/0054807 A1 * | 3/2004 | Harvey et al. | 709/243 |
| 2004/0098502 A1 * | 5/2004 | Xu et al. | 709/238 |
| 2004/0210624 A1 * | 10/2004 | Andrzejak et al. | 709/201 |
| 2005/0053000 A1 * | 3/2005 | Oliver et al. | 370/231 |
| 2005/0086469 A1 * | 4/2005 | Dunagan et al. | 713/163 |
| 2005/0091399 A1 * | 4/2005 | Candan et al. | 709/238 |
| 2005/0198333 A1 * | 9/2005 | Dinges et al. | 709/229 |
| 2005/0243740 A1 * | 11/2005 | Chen et al. | 370/256 |
| 2006/0039371 A1 * | 2/2006 | Castro et al. | 370/389 |
| 2006/0239275 A1 * | 10/2006 | Zlateff et al. | 370/400 |
| 2007/0195698 A1 * | 8/2007 | Briscoe et al. | 370/235 |

OTHER PUBLICATIONS

Brookshier, Daniel, "The Socket API in JXTA 2.0" [Online], Apr. 2003 [retrieved on Jan. 30, 2009], Sun Systems, <http://java.sun.com/developer/technicalArticales/Networking/jxta2.0/>, pp. 1-8.*

Haendel, Lars, "The Function Pointer Tutorials" [Online], Dec. 2003 [retrieved on Jan. 30, 2009], <http://web.archive.org/web/20031205170140/www.newty.de/fpt/introl.html>, sections 1-3.*

DRA Systems, "Class Connections" [Online], 2000 [retrieved on Jan. 30, 2009], <http://www.mathematik.hu-berlin.de/~lamour/software/JAVA/OR-Objects/drasys/or/graph/sp/Connections.html>, pp. 1-7.*

* cited by examiner

*Primary Examiner*—Bunjob Jaroenchonwanit
(74) *Attorney, Agent, or Firm*—Marshall, Gerstein & Borun LLP

(57) ABSTRACT

The claimed method and system provides a method and interface for enabling an existing, single-transport P2P API to communicate with nodes of a P2P network using multiple different transport protocols.

5 Claims, 12 Drawing Sheets

TRANSPORT ABSTRACTION FOR MULTIPARTY REPLICATION

This application is a continuation-in-part of application Ser. No. 11/111,532 entitled, "Peer-to-Peer Multicasting Using Multiple Transport Protocols," filed Apr. 21, 2005.

BACKGROUND

Peer-to-peer (P2P) systems employ a network of nodes that communicate with each other in a decentralized manner, e.g., without the aid of a central server. Each node (e.g., an application or a device) in the peer-to-peer network may communicate with another node on the network through a direct connection, or each node may communicate indirectly using an intermediary node to relay communications to an intended node. Peer-to-peer networks may be created using an application program interface (API) that provides basic peer-to-peer functionality, such as graph creation functions, network maintenance functions, message flooding, transport protocols, etc. Thus, an application using a peer-to-peer API may, for example, create a peer-to-peer network, connect to the P2P network, and communicate with other nodes in the network using the functions provided by the peer-to-peer API.

Existing peer-to-peer APIs usually have only a single native transport protocol that may be used to interface with an entity wishing to connect to the network. This transport strategy may work in cases where all of the peer entities to be connected to the P2P system are capable of communicating with each other using the implemented native transport protocol. If this is not the case, however, this solution fails to provide a mechanism for connecting all participants together. For example, a single protocol may be unable to connect participants together when those participants are coupled to a network behind various firewalls, network address translators (NATs), etc., which require different specialized transport protocols.

SUMMARY

The present invention provides a method and interface for enabling an existing, single-transport P2P API to communicate with nodes of a P2P network using multiple different transport protocols. The P2P API may be a peer-to-peer overlay functionality (PPOF) component that provides general P2P functionality. The PPOF may include a native transport component that is used to implement an actual physical connection with another node in a P2P network, or graph.

In one embodiment, the PPOF API is modified to use an endpoint provider interface. The endpoint provider interface may then be used to override the native transport protocol of the PPOF and enable the use of a different transport protocol provided by an endpoint provider functionality (EPPF) component. The endpoint provider functionality (EPPF) component may be configured to establish a connection with an entity using a transport protocol specific to that entity. This transport strategy accommodates multiple different protocols for exchanging information among the plurality of participants, allowing different pairs of participants to communicate with each other using different respective transport protocols.

The PPOF and the EPPF may be developed separately, and different EPPFs may be "plugged into" the PPOF depending on the need of a particular environment. This EPPF-interchangeability follows from the EPPF's use of an address translation function (ATF), which converts between the address space used by the PPOF and the address space used by the EPPF (without requiring either of these functionalities to be redesigned in order to accommodate the other).

In one embodiment, a PPOF address space is associated with the graphing functionality and an EPPF address space is associated with the endpoint provider functionality. The ATF is configured to translate address information from the PPOF address space to the EPPF address space, and from the EPPF address space to the PPOF address space. Additional embodiments are described.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
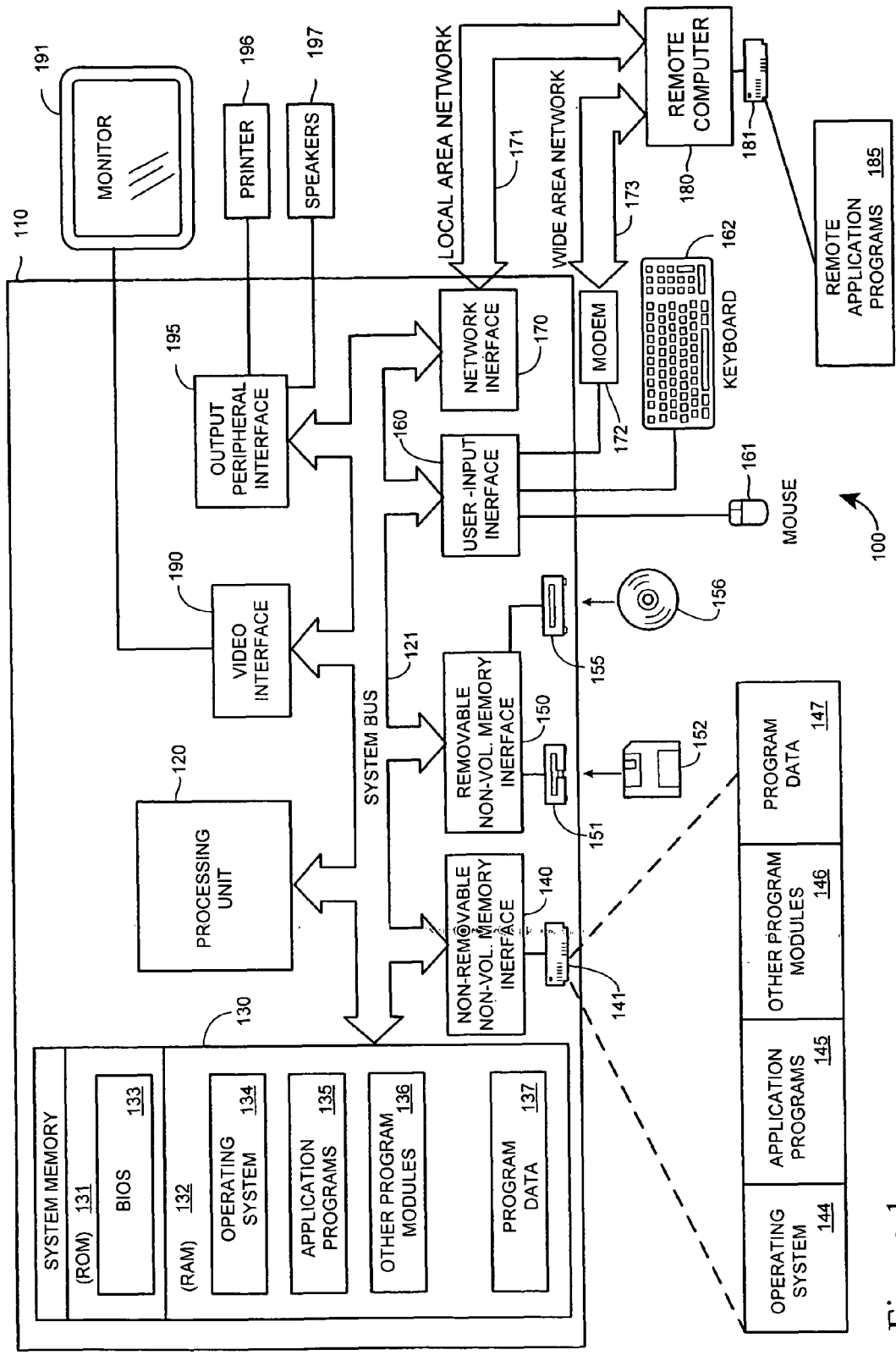
FIG. 1 illustrates an exemplary computer environment for implementing aspects of the claimed system.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary computing environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules, and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections illustrated are exemplary and other means of establishing a communications link between the computers may be used.

Figure 2:
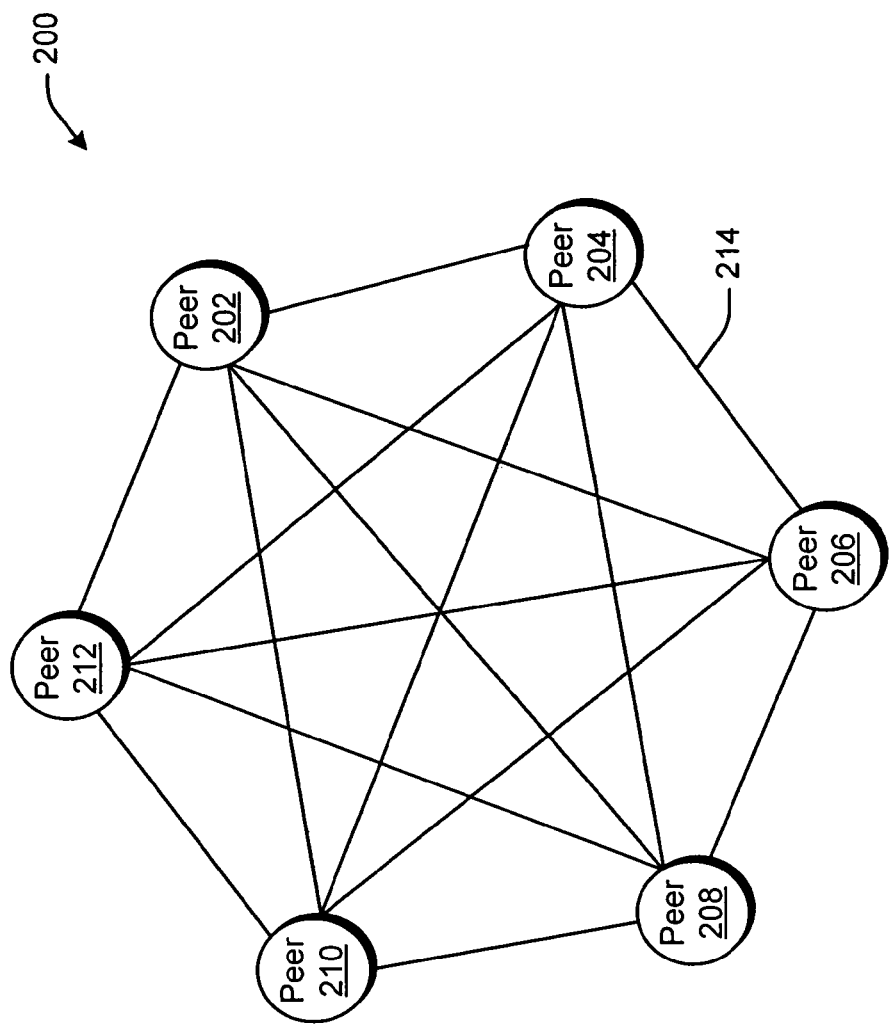
FIG. 2 illustrates a conventional peer-to-peer (P2P) system.

Peer-to-peer (P2P) systems employ a network that connects participating entities together in a decentralized manner. That is, in a P2P system, a first participant may be directly coupled to a second participant or the first participant may be coupled to the second participant through a chain of one or more intermediate participants. A peer entity may be a device, such as a computer, an application, and/or any resource that may interact with a network. FIG. 2 illustrates a high-level depiction of a P2P system 200. The system 200 includes a collection of peer entities (202-212). The peer entities (202-212) may be personal computer devices that are coupled together via any network or combination of networks (such as the Internet). FIG. 2 illustrates an example in which each peer entity (202-212) is connected to all other peer entities (202-212). In other cases, one or more peer entities (202-212) may be connected to other peer entities (202-212) via one or more intermediary participants (202-212).

Peer-to-peer networks, or graphs, operate using some basic functionality. For example, any pair of directly connected peer entities (202-212) may directly transfer files or other information between themselves (as indicated by the exemplary communication path 214 between peer entity 204 and peer entity 206). Any pair of indirectly connected peer entities (202-212) may transmit information between themselves via one or more intermediary peer entities (202-212) (which act to relay the information). These functions allow any two peer entities (202-212) to exchange information without the aid of a server (or with only minimal set-up tasks performed by the server). The P2P system 200 may also include multicasting functionality for disseminating information to a plurality of peer entities. For example, the multicasting functionality may propagate information from any peer entity to all of the other peer entities (202-212). The multicasting functionality may also provide a mechanism for synchronizing the individual stores (not illustrated) maintained by the respective peer entities (202-212). This ensures that the peer entities (202-212) maintain the same replicated information in their respective stores. One feature enabled by the multicasting functionality may be real-time peer-to-peer communication among multiple participants, e.g., an instant messaging application.

A peer-to-peer system may be implemented using a peer-to-peer overlay functionality (PPOF) component, such as an application program interface ("API"), which provides general P2P network functionality. Thus, a PPOF API may be used to define a group of nodes that represent participants of a P2P system. Collectively, the nodes represent an interconnected mesh, or "graph," according to the terminology used hereinafter. The PPOF API (hereinafter, "PPOF") functionality may further include functions for creating and initializing a graph, monitoring a graph, maintaining graph integrity, message flooding, general message management, etc. The PPOF may also include a native transport function that provides an actual physical connection between the nodes in a graph.

Figure 3:
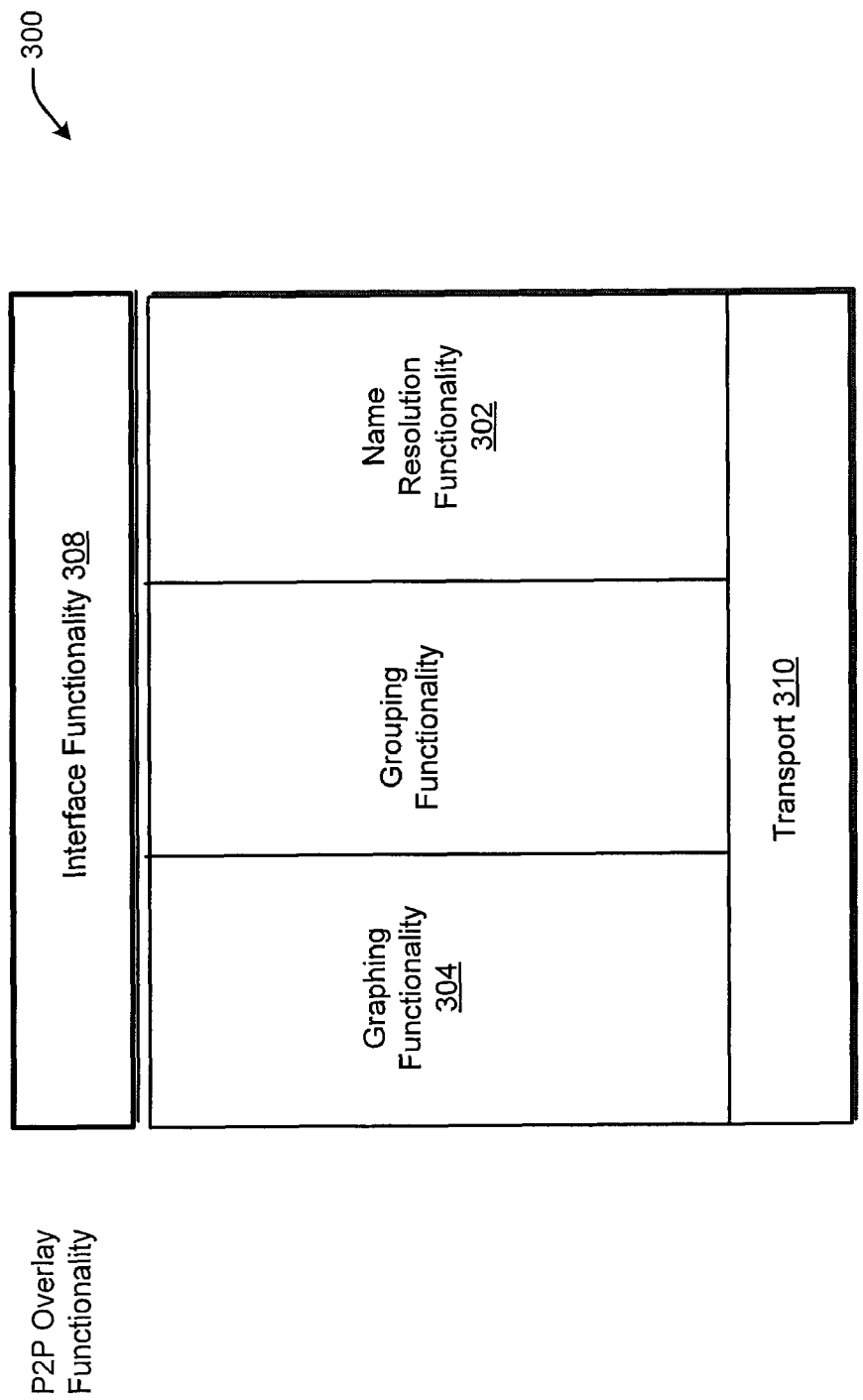
FIG. 3 illustrates exemplary P2P overlay functionality (PPOF)

FIG. 3 identifies exemplary aspects of a PPOF 300. One aspect is name resolution functionality 302. The name resolution functionality 302 provides a technique for locating peer entities within a P2P system. To perform this task, the name resolution functionality 302 uses a distributed hash table (DHT) to facilitate the storage and retrieval of information in the P2P system.

Another aspect of the PPOF 300 is graphing functionality 304. The graphing functionality 304 may be responsible for creating and managing the mesh of interconnected nodes. The nodes in the graph may represent peer entities (e.g., 202-212) in a P2P system (e.g., 200). However, the graph itself defines an interconnection structure that logically (rather than physically) describes the connection between the peer entities. The organization of nodes in the graph is a logical construct, or model. For instance, the graph may indicate that two nodes are directly coupled together. However, physically, these two nodes may be connected together using an indirect connection strategy. For example, a P2P system may physically connect these nodes together via a routing server, etc.

The graphing functionality 304 may include a flooding mechanism for propagating record objects throughout the graph. For example, using the flooding mechanism, the graphing functionality 304 may disseminate a record object from any given node in the graph to all of the other nodes in the graph. The graphing functionality 304 further includes a synchronization mechanism for ensuring that all of the stores maintained by the nodes in the graph contain the same record objects. In the process of flooding, a node that is coupled to the graph via multiple neighboring nodes may potentially receive multiple copies of the same record object. To address this issue, a node includes provisions for assessing the utility of record objects that it receives. For example, a record object that has already been received has a low utility associated therein. A node may ignore updates pertaining to record objects having low utility associated therewith.

Various events in a communication session may break the links between nodes in the graph, causing partitions in the graph. For example, a node that leaves a graph may cause a partition in the graph. To address this issue, the graphing functionality 304 includes a graph maintenance mechanism for repairing partitions in the graphs.

Figure 4:
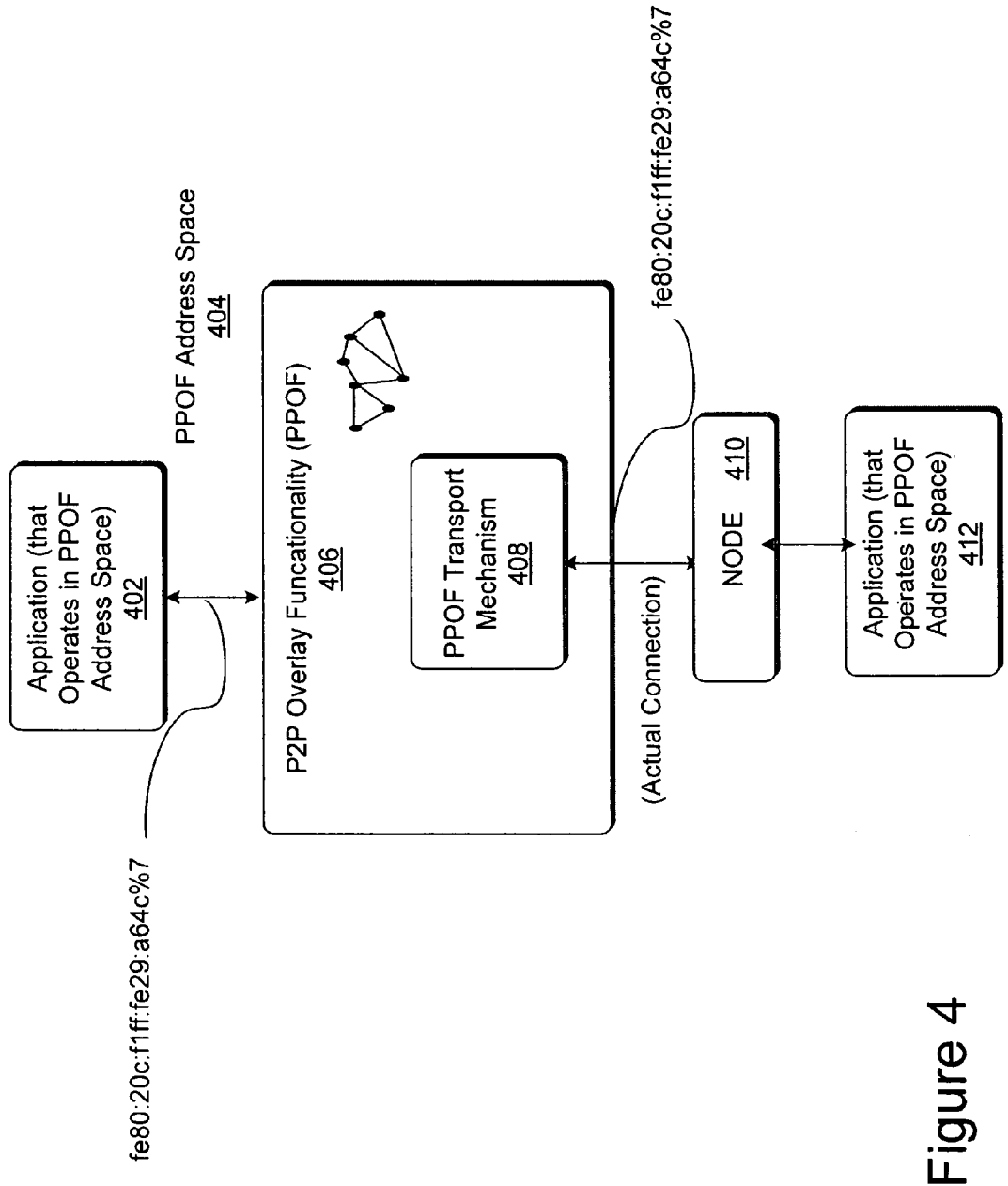
FIG. 4 illustrates a PPOF using only its native transport mechanism.

Another aspect of the PPOF 300 is transport functionality 310. The transport functionality 310 implements the physical transport that links nodes in the graph together. The PPOF 300 may provide a default (native) transport mechanism, implementing a default (native) transport protocol, to perform this coupling (such as IPv6, as applied to all links in the graph). The terms "transport mechanism" and "transport protocol" are used interchangeably herein. Because existing peer-to-peer APIs, such as the PPOF 300, may have only a single native transport protocol for connecting entities to the network, these APIs are limited to applications or devices that use the native transport protocol. For example, a graph may initially be created by an application, in which case the graph has one node. In existing P2P APIs, to establish a connection to a second node, the second node may need to communicate with the PPOF 300 using the PPOF native transport protocol. FIG. 4 illustrates an existing PPOF 406 that interacts with two applications 402, 412 using only the native transport protocol 408. The application 402 may represent an application instance running on the same machine as the PPOF 406, thus having a direct connection to the PPOF 406 and not needing to communicate using the native transport protocol 408. The application 412 may be an application running on a different node 410 that must communicate using the native transport protocol 408. All components in FIG. 4 use the PPOF address space 404 (address space will be discussed further below).

In an embodiment of the claimed method and system, a peer-to-peer API, e.g., the PPOF 300, may be adapted to use multiple transport protocols by redirecting some of the transport functionality from the PPOF native transport. An endpoint provider interface may be designed for or integrated into the PPOF 300. Using the interface, the PPOF 300 may access a "pluggable" endpoint provider functionality (EPPF) component, hereinafter, "EPPF," for implementing the physical transport. The EPPF, when available, may simply override the native transport mechanism 408 or work in conjunction with the native transport mechanism 408 to provide functionality for communicating with nodes using a set of various transport protocols. Transport function requests may be directed towards the endpoint provider interface, which in turn may direct the transport requests to an EPPF for actual execution. An application may register the pluggable EPPF with the PPOF 300 to override its default transport protocol 408. Alternatively, another entity may register the EPPF with the PPOF 300. For example, the EPPF may self register itself as the endpoint provider of the PPOF 300, or the PPOF 300 may register an EPPF.

Figure 5:
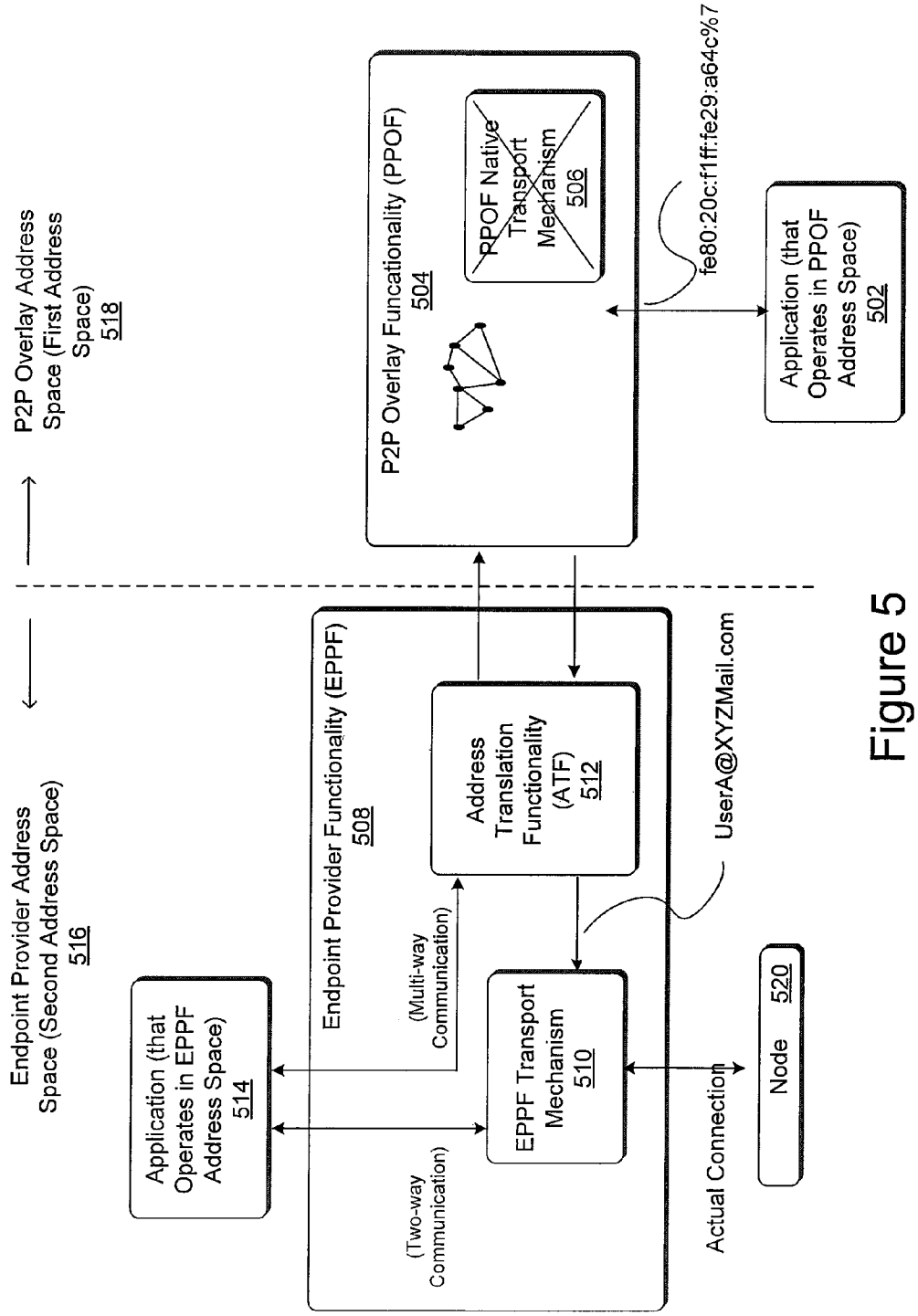
FIG. 5 illustrates a PPOF using an EPPF where one application is connected to the PPOF and another application is connected to the EPPF.

The endpoint provider component may be implemented in different ways. FIG. 5 illustrates one embodiment in which an application 502 may use a PPOF 504 to establish a graph using an EPPF 508 to enable the PPOF 504 to communicate with nodes using different transport protocols. As an example, in FIG. 5 the application 502 is originally designed to use the PPOF transport mechanism 506 as its native transport mechanism to transmit information between two participants. The application may be adapted to accommodate multi-transport communication by configuring the PPOF 504 to use the EPPF 508's transport mechanism 510, instead of the PPOF 504 native transport protocol 506. Thus, in operation, the application 502 accesses the PPOF 504 to make use of the PPOF 504's core services (e.g., information flooding and data store synchronization within a graph), while the PPOF 504 accesses the transport mechanism 510 (via the ATF 512, to be discussed below) to perform the actual connection between nodes in the graph.

In FIG. 5, the PPOF 504 initiates the creation and connection to an EPPF 508 as a way to connect to an application 514, or a node 520, that uses a non-native transport protocol. In this case, a PPOF 504 may be a pre-existing instance of the currently running application 502. In one embodiment, the PPOF 504 may be directly accessed by the application 502 without the need to use the native transport protocol 506, e.g., when the PPOF 504 and the application instance 502 run on the same machine. Alternatively, the application instance 502 may use the native transport protocol 506 and associated address space to communicate with the PPOF 504 component.

Figure 6:
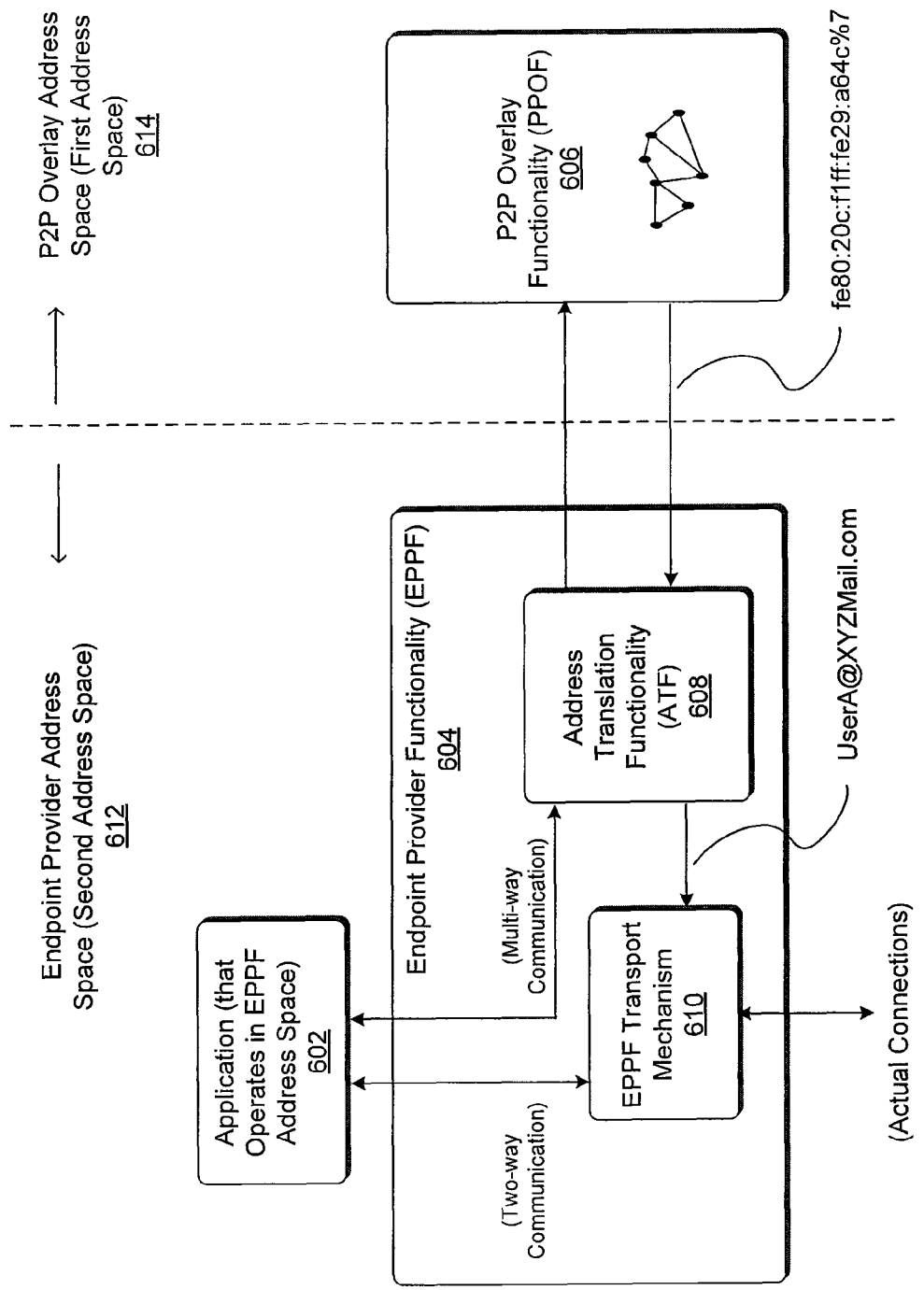
FIG. 6 illustrates an application connecting to a PPOF using an EPPF.

Different connection processes may be used to associate a particular EPPF with a PPOF, so that the PPOF will rely on the EPPF as its endpoint provider. In the above case, the application 502 may register the EPPF 508 with the PPOF 504. In another case, the EPPF may register itself with the PPOF. For instance, suppose that there is only one PPOF. In this case, the EPPF may register itself with the PPOF when an application starts up the EPPF. This is illustrated in FIG. 6. In this embodiment, an application 602 may instantiate an EPPF 604 which then manages the creation of and connection to a PPOF 606. An example of this connection process is a chat application, such as MS messenger that may want to utilize the functionality of the PPOF, but must communicate using a different protocol and address space from the native PPOF transport. In this manner, the chat application may leverage the functionality provided by a graphing object such as the PPOF without having to be modified to work under IPv6.

Other registration protocols may be used to associate and couple an EPPF and PPOF. Note that while FIGS. 4-6 illustrate a single application 602 that utilizes the services of a single EPPF, any number of applications may make use of a single EPPF, or a single application may potentially make use of plural EPPFs. In one design approach, the applications and EPPFs may be designed in a modular fashion, so that an application may swap one EPPF for another without necessitating redesign of the application or the EPPFs.

Figure 7:
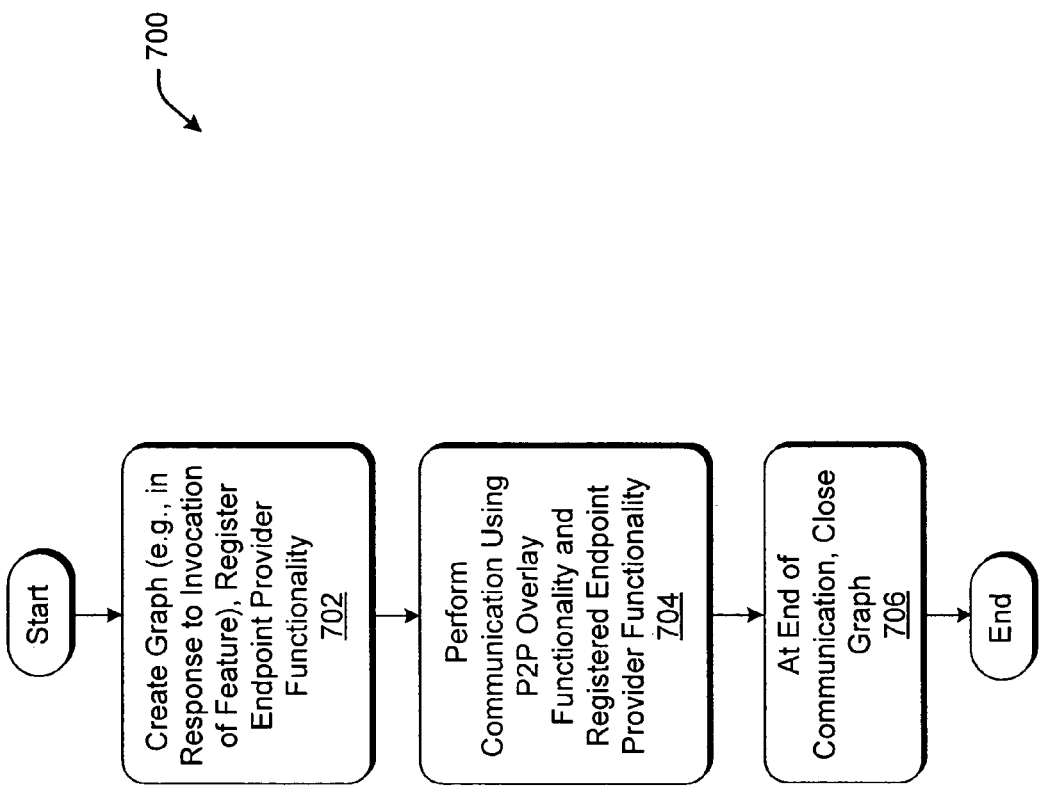
FIG. 7 illustrates an overview of the operation of the claimed P2P system.

FIG. 7 illustrates a procedure 700 that provides a general overview of the operation of the communication functionality of the claimed system. In block 702, a multi-party communication application activates a PPOF. This prompts the PPOF to create a graph having nodes that represent the participants. The application (or other entity) may also register a selected EPPF with the PPOF. This registration operation informs the PPOF that the selected EPPF may be used to implement the physical exchange of information between participants.

In block 704, the communication functionality performs a communication session using both the PPOF and the EPPF. That is, the PPOF performs the logical management of the graph, while the EPPF implements the physical coupling of links in the graph and the actual exchange of information among nodes in the graph. More precisely, the transport mechanism, e.g., 510 and 610 of the EPPF 508 and 604, respectively, performs the physical coupling. The communication session may correspond to a multi-party instant messaging (IM) chat session (having three or more participants).

In block 706, the communication functionality may close the graph at the end of the communication session. For example, a communication session may end when all of the participants leave the multi-party conversation.

Figure 8:
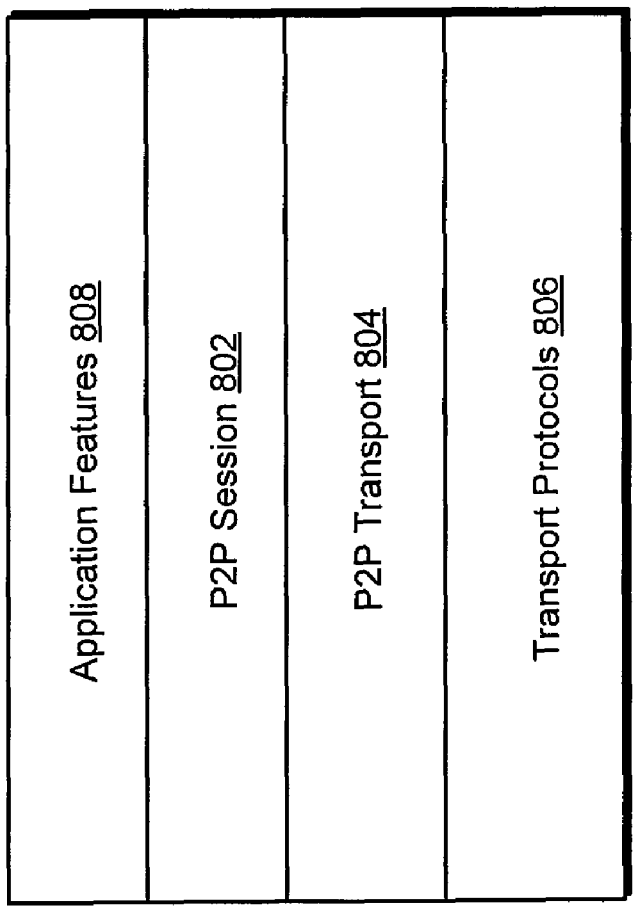
FIG. 8 illustrates an exemplary transport mechanism used by an EPPF.

FIG. 8 illustrates additional details regarding the transport mechanism of the EPPF. As illustrated in FIG. 8, the transport mechanism 510, 610 may be implemented as a protocol stack of various P2P-related protocol layers (802-806). A P2P session layer 802 defines a main object of transport API. Higher level features may interact with the P2P session layer 802. More specifically, this layer 802 may encapsulate the concept of the conversation between participants and expose methods to send and receive data among participants. The P2P transport layer 804 may handle the actual transmission of the P2P session traffic from one participant device to another participant device via particular transport protocols. Among other duties, the P2P transport layer 804 may perform the score-based selection of transport protocols in a manner described below. The transport protocols layer 806 pertains to the actual transport protocols that a participant device may employ to form a P2P connection with another participant device. The various P2P layers (e.g., 802, 804, 806) together may form a transport strategy.

In a application-related context, a feature-related protocol layer 808 may be logically provided "above" the protocol stack (802, 804, 806). The feature-related layer may be responsible for handling different facets of the application. For instance, an IM application may allow a participant to communicate in different ways with another participant, such as by exchanging textual IM messages with another participant, exchanging files with another participant, exchanging images with another participant, and so forth. Each one of these separate facets may be regarded as a feature herein. One particular feature in the feature layer entails using the PPOF's message flooding functionality. The PPOF may be invoked when the participant enters a command to commence a multi-party communication session, or when the participant responds to an invitation to join such a session.

As discussed above, existing PPOFs may only use a single transport mechanism. Along with the specific transport mechanism may be a transport specific address space. The term "address space" may refer to a mode of identifying participants in the P2P system. It may be noted that these address spaces identify the same participants, but do so using a different addressing formats (analogous to expressing the same number in binary format or hexadecimal format). In isolating the transport functionality of the PPOF from the rest of the graphing and P2P network functionality, differences in address spaces may be addressed.

FIGS. 5 and 6 illustrate an address translation functionality (ATF) 512, 608 portion of the EPPF 508, 604. As illustrated in FIG. 5, the PPOF 504 may use a PPOF addressing scheme, in a PPOF address space 518, to identify participants of a communication session and the EPPF 508 may use an EPPF addressing scheme, in an EPPF address space 516, to identify the same participants. The EPPF 508 may be said to use the EPPF address space 516 in the sense that the upper layers of its transport mechanism 510 identify participants using the EPPF address space 516. However, in some exemplary implementations, the lower levels of the transport mechanism 510 may rely on one or more transport protocols that operate in respective address spaces, which may differ from the EPPF address space 516 and the PPOF address space 518. It should be noted that while the ATF 512 is illustrated as a component of the EPPF 508, the ATF 512 may be implemented by the PPOF 504, or may be implemented by both the EPPF 508 and the PPOF 504, or may be implemented as a standalone component.

The PPOF 504 may be designed to use, for example, IPv6 as a native transport mechanism and thus, may use associated IPv6 data structures (e.g., data structures which use IPv6 addresses and parameters). This native transport mechanism may identify participants using a prescribed addressing scheme. Because of the modularity in the design of the communication functionality, the EPPF 508 may identify participants using a different addressing scheme. For example, the transport mechanism 510 of the EPPF 508 may identify participants using user names associated with email accounts, e.g., an EPPF for an IM application. The role of the ATF 512 in this scenario may be twofold. First, when the EPPF 508 forwards address information to the PPOF 504, the ATF 512 may be required to convert the address information from the user name format to the IPv6 format. Second, when the EPPF 508 receives address information from the PPOF 504, it may be required to convert the address information from the IPv6 format to the user name format. Of course, the use of IPv6 and user name address spaces is merely illustrative; this example does not limit the use of the communication functionality in a wide variety of environments that use different addressing schemes to identify participants.

As another feature, assume that the address space scenario set forth above applies here. In this case, the application 514 and the EPPF 508 may identify participants using user name information. However, as mentioned, the PPOF 504 may use some other native address space to identify the participants, such as IPv6. To avoid the need to completely reconfigure the PPOF 504 to make its address space conform to the EPPF 508's address space (or vice versa), the EPPF 508 may employ the ATF 512 to convert between the user name address space (used by the application 514) and the IPv6 address space (used by the PPOF 504 and application 502).

PPOF Interface

The interface functionality 308 of FIG. 3 may include an interface mechanism for allowing an EPPF to interact with the PPOF 300. As discussed above, this interface mechanism may permit an application (or other entity) to register a "third party" EPPF for providing the physical coupling between links in the graph. The registered EPPF may, in effect, override any default endpoint provider functionality supplied by the PPOF 300 itself (such as IPv6).

The interface functionality 308 may include basic function parameters. In one embodiment the interface specification may define three primary functions: a create graph method, an open graph method, and a set of function pointers. The example interface functionality mechanisms 308 are further described as follows.

A graph creation method (PEER_GRAPH_CREATE_EX) may create a new graph. It may also provides the opportunity to specify the EPPF to be used in the graph and the type of security that the graph may use, as well as other aspects of the graph. This API may return a graph handle that is allocated to the newly created graph.

A graph open method (PEER_GRAPH_OPEN_EX) may open a graph that has been previously created.

An endpoint provider data structure (PEER_ENDPOINT_PROVIDER) provides a list of function pointers that the graphing functionality 304 may call into any time a network operation is requested of it. The data structure may be provided in the above-mentioned graph creation and open methods. The data structure specifies the following methods, described in further detail below: INIT_FUNC, SHUTDOWN_FUNC, LISTEN_FDNC, STOP_LISTENING_FUNC, GET_LISTEN_INFO_FUNC, CREATE_CONNECTION_FUNC, CLOSE_CONNECTION_FUNC, SEND_MESSAGE_FUNC, and GET_CONNECTION_INFO_FUNC.

The initialization method (INIT_FUNC) may be called by the graphing functionality 304 when a graph is created or opened. In response to this initialization method, the EPPF may be expected to perform any necessary initialization and store callback function pointers for later use. This initialization method may reference the following exemplary callbacks:

OnIncomingConnection: The EPPF may initiate this callback when a new connection is accepted.

OnConnectionChange: The EPPF may initiate this callback when the status of a connection is changed.

OnMessageSent: The EPPF calls may initiate callback after a message is sent.

OnMessageReceived: The EPPF may initiate this callback when a message is received.

OnAddressChange: The EPPF may initiate this callback if it detects that underlying address information has changed.

The shutdown method (SHUTDOWN_FDNC) may be called by the graphing functionality 304 to inform the EPPF to perform any necessary cleanup operations following the shutdown of a connection.

The listen method (LISTEN_FUNC) may inform the EPPF that it should begin listening for incoming connection on a specified scope.

The stop listening method (STOP_LISTENING_FUNC) may inform the EPPF to stop accepting new incoming connections.

The get listen info method (GET_LISTEN_INFO_FUNC) may inform the EPPF to return an array of addresses for which it is listening on a specified port.

The create connection method (CREATE_CONNECTION_FUNC) may inform the endpoint provider to create a new connection to a node specified in an address parameter ("pAddr").

The close connection method (CLOSE_CONNECTION_FUNC) may closes a connection with a specified connection ID.

The message send method (SEND_MESSAGE_FUNC) may instruct the EPPF to send a message on a specified connection ID.

The get connection info method (GET_CONNECTION_INFO_FUNC) may instruct the EPPF to retrieve information regarding a specified connection ID.

EPPF Functionality

The EPPF may include a complementary set of methods designed to interact with the APIs provided by the PPOF (described above).

An initialization function (Init) may be called when a new graph is created. It may store the set of callback functions that PPOF passes to the EPPF for various events defined above. Every time the Init function is called, a counter ("init count") may be incremented.

A shutdown function (Shutdown) may be called when a graph is closed. It may decrement the counter from the Init call. If this counter decrements to zero, all connections are may be close closed, and the EPPF may go back to its un-initialized state.

A listen function (Listen) may initiate a listening mode in which the EPPF listens for incoming connections.

A stop listening function (StopListening) may terminate the listening mode.

A get listen info function (GetListenInfo) may return an array of addresses representing the addresses that the EPPF is listening on, which are converted into IPv6 addresses by the ATF (in one exemplary implementation).

A get connection info function (GetConnectionInfo) may provide address information when called.

A creation connection function (CreateConnection) may create a connection. This function may create the connection by performing the following operations:

(1) Validate that an intended address specified matches the hash of one of the participants in the local participant's contact list;

(2) Create an IM session with that participant (if not already established);

(3) Create a slave P2P session on top of this session;

(4) Create a local connection data structure that stores session interface pointers, addresses, and other information related to this connection; and (5) Return back to the PPOF a unique connection ID to reference this connection for subsequent API calls.

A close connection function (CloseConnection) may shut down and releases the session objects associated with the connection referenced by the connection ID.

A send message function (SendMessage) may send information over an established connection.

Instant Messaging (IM) Example

Figure 9:
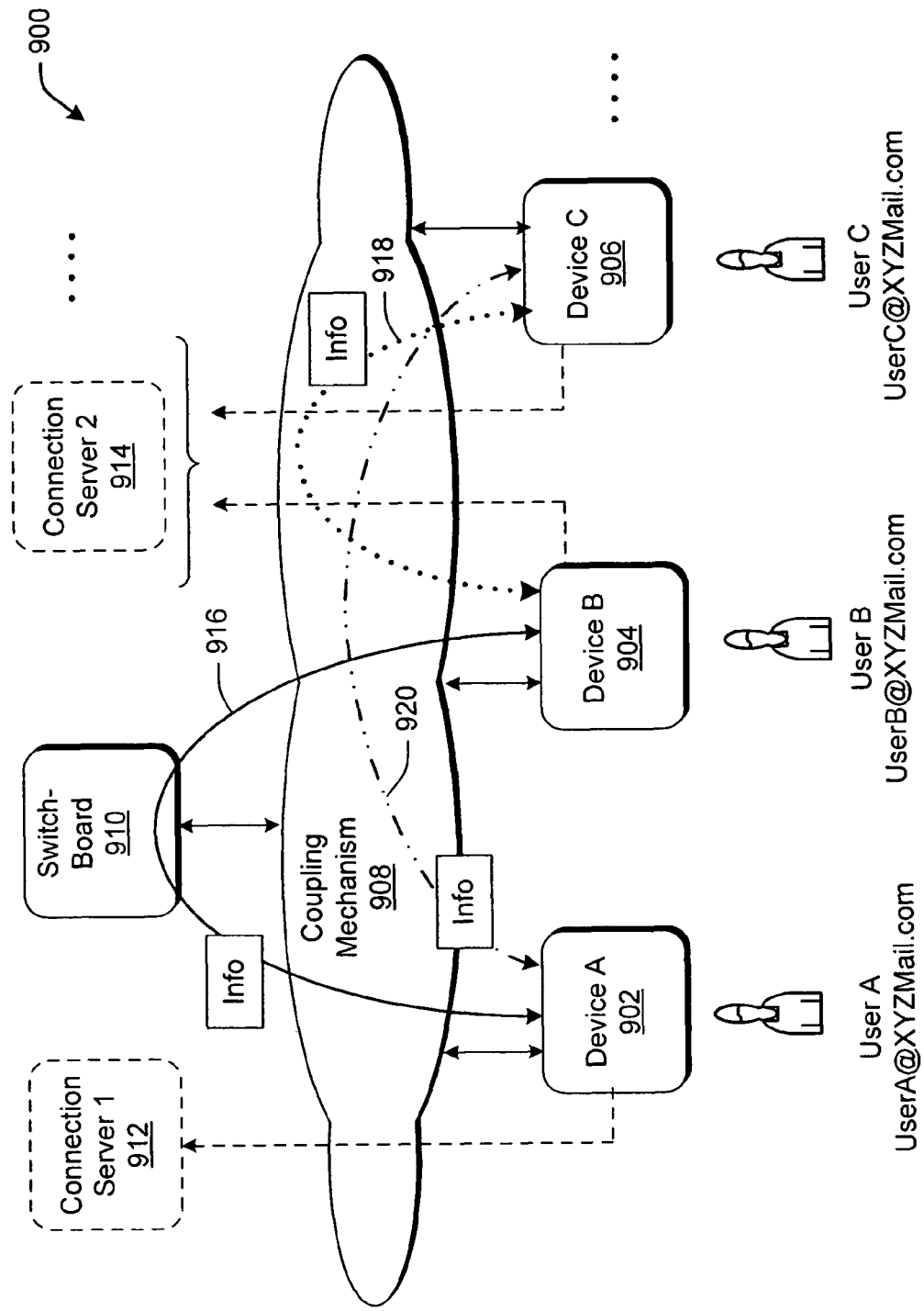
FIG. 9 illustrates a specific system that implements one exemplary instance of the claimed P2P system.

FIG. 9 may illustrates a system 900 that illustrates one exemplary implementation of the P2P system in which there are three participants, user A (Alice), user B (Bob) and user C (Carol). Of course, the system 900 may accommodate many more participants (not illustrated). The system 900 may pertain to an exemplary scenario in which instant messaging-related functionality is provided to allow the participants to communicate with each other in a multi-party real-time chat session.

FIG. 9 may illustrate that the participants (A, B, and C) operate three respective participant devices (902, 904, 906), corresponding to three peer entities (902-912). The participant devices (902, 904, 906) may generally comprise any type of processing devices for sending and/or receiving messages. For example, the participant devices (902, 904, 906) may be implemented as general purpose computers (such as personal computers), portable computers (e.g., laptop computers, mobile telephone devices, various kinds of wearable computers, etc.), and so forth. Or the participant devices (902, 904, 906) may be implemented as application-specific consoles (such as Microsoft Corporation's Xbox™ game consoles, set-top television boxes, and so forth). Still other implementations are possible.

A coupling mechanism 908 may couple all of the participant devices (902, 904, 906) together. The coupling mechanism 908 may include any kind of routing infrastructure or combination of routing infrastructures. For instance, the coupling mechanism 908 may include any combination of wide area network, local area network, point-to-point connectivity, and so on. In one example, the coupling mechanism 908 may utilize the communication resources of the Internet. The coupling mechanism 908 may also include various routers, gateways, etc. (not illustrated). The communication links employed by the coupling mechanism 908 may include any combination of hardwired links (conventional copper, optical, cable, etc.), wireless links, etc.

In existing instant messenger (IM) applications, the system 900 may include various servers devoted to the task of facilitating the exchange of IM information. For instance, the system 900 may provide a switchboard 910 (or plural switchboards, not illustrated). The switchboard 910 may serve the purpose of exchanging setup information between the participant devices (902, 904, 906), and may also route IM information between participant devices (902, 904, 906) for some transport protocols. The system 900 may also provide plural connection servers, such as exemplary connection server (1) 912 and connection server (2) 914. In this illustrated scenario, when participant device A 902 first logs on, it connects to connection server 912. When participant devices B and C (904, 906) log on, they connect to connection server 914. The connection servers (912, 914) may facilitate the preparatory exchange of control information to establish a connection. However, it should be noted that the system 900 is merely one example; other implementations may entirely dispense with switchboards and connection servers, or may provide additional network functionality (not illustrated).

FIG. 9 also illustrates that the communication functionality may use different transport protocols to connect different pairs of participant devices (902, 904, 906) together. For example, a first path 916 connects participant device A 902 with participant device B 904, and may be used to exchange information between these participant devices (902, 904). A second path 918 connects participant device B 904 with participant device C 906, and may be used to exchange information between these participant devices (904, 906). A third path 920 connects participant device A 902 with participant device C 906, and may be used to exchange information between these participant devices (902, 906). FIG. 9 corresponds to the exemplary case where each participant may be connected to each of the other participants in direct fashion, but the EPPF described above may also be applied to meshes in which some participants may be connected together only through one or more intermediary participants.

Figure 10:
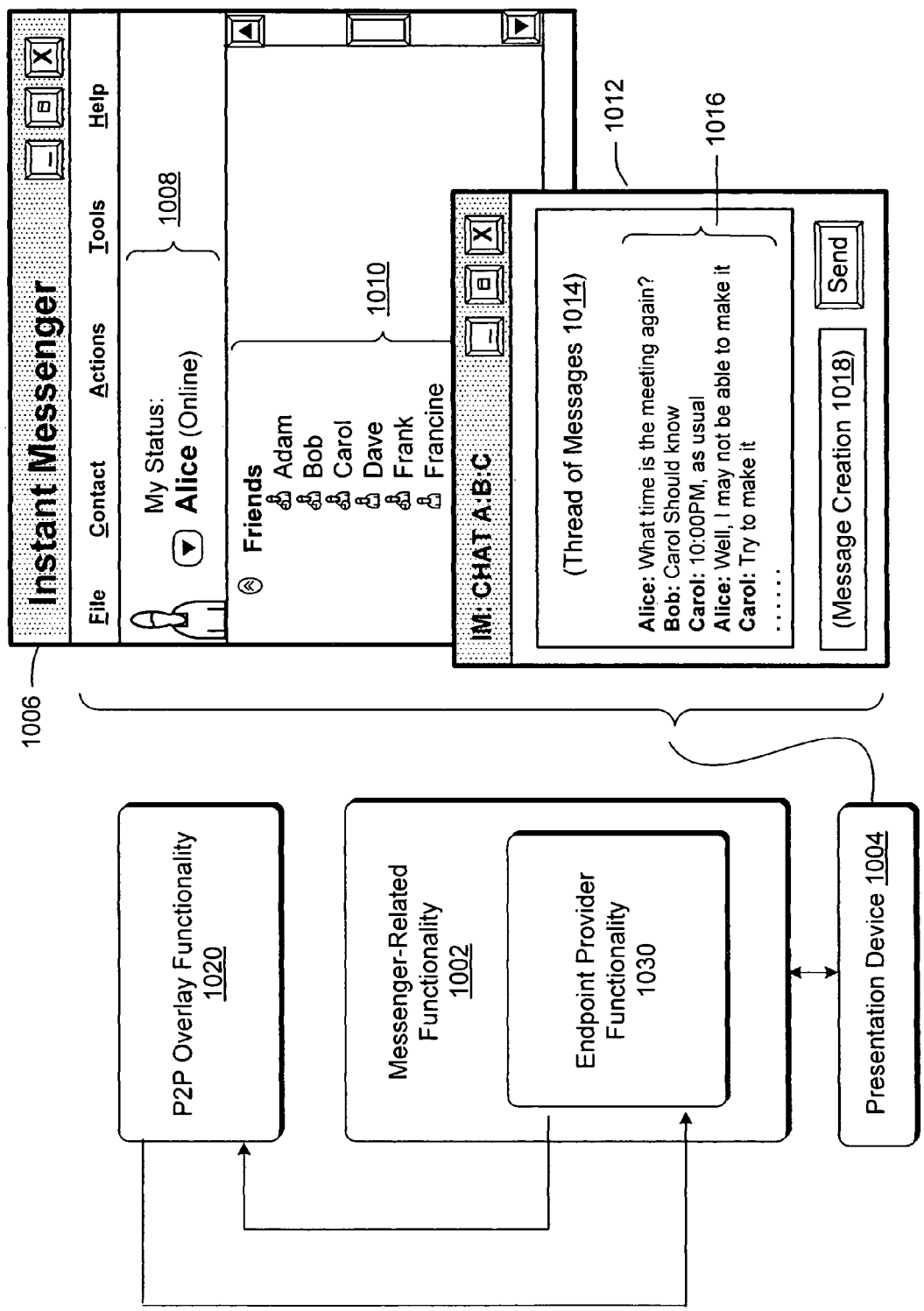
FIG. 10 illustrates an exemplary client device for use in implementing the claimed P2P system.

Alice may also initiate a multi-party conversation (including three or more participants) through selection of an appropriate command on a user interface presentation 1006, illustrated in FIG. 10. This may prompt a messenger-related functionality 1002 to activate a separate conversation user interface box in which Alice may interact with plural participants, such as both Bob and Carol. For example, FIG. 10 may illustrate an exemplary multi-party communication box 1012. This box 1012 includes a first portion 1014 that illustrates an evolving sequence of messages 1016 sent by Alice, Bob and Carol. This box 1012 also includes a second portion 1018 that allows the operator, Alice, to enter a text message for transmission to Bob and Carol. The P2P system may transmit the message to Bob and Carol through replication functionality called flooding. Bob and Carol may operate participant devices (904, 906) and each such device may provide a user interface presentation that is similar to box 1012.

Returning to the left-hand portion of FIG. 10, the messenger-related functionality 1002 may be implemented as software, firmware, or a combination of software and firmware. FIG. 10 illustrates the case where the messenger-related functionality 1002 may be physically incorporated into the participant device A 902 itself (e.g., as implemented by machine-readable instructions stored in one or more stores provided by the participant device A 902). Alternatively, one or more of the functions performed by the messenger-related functionality 1002 may be implemented elsewhere. For instance, one or more functions may be provided by network functionality. This may correspond to the case where the IM service is enabled as a web-end service, rather than a client-end service.

However implemented, one aspect of the messenger-related functionality 1002 may be an application feature which implements the PPOF 300. Namely, this application feature may correspond to the functionality that is invoked when the participant, Alice, creates a multi-party communication session or joins an existing multi-party communication session. The messenger-related functionality 1002 may also implement the EPPF (providing the transport mechanism that accommodates plural transport protocols). Thus, the application feature may invoke the PPOF to create a graph, and the PPOF, in turn, may interact with the transport mechanism of the EPPF via the ATF to provide the physical coupling between links in the graph. FIG. 10 corresponds to the case where the messenger-related functionality 1002 may include the EPPF as an integral component thereof, but it is also possible to implement the EPPF as a module that is separate from the messenger-related functionality 1002.

Address Translator Functionality (ATF)

FIGS. 5 and 6 illustrate that the manner in which the ATF 512, 608 aspects of the EPPF 508, 604 may fit in with the above-described stack structure. For example, logically speaking, the part of the ATF 512, 608 functionality that converts from the PPOF 504, 606 space to the EPPF 508, 604 space is positioned between the PPOF 504, 606 and the transport mechanism 510, 610.

Figure 11:
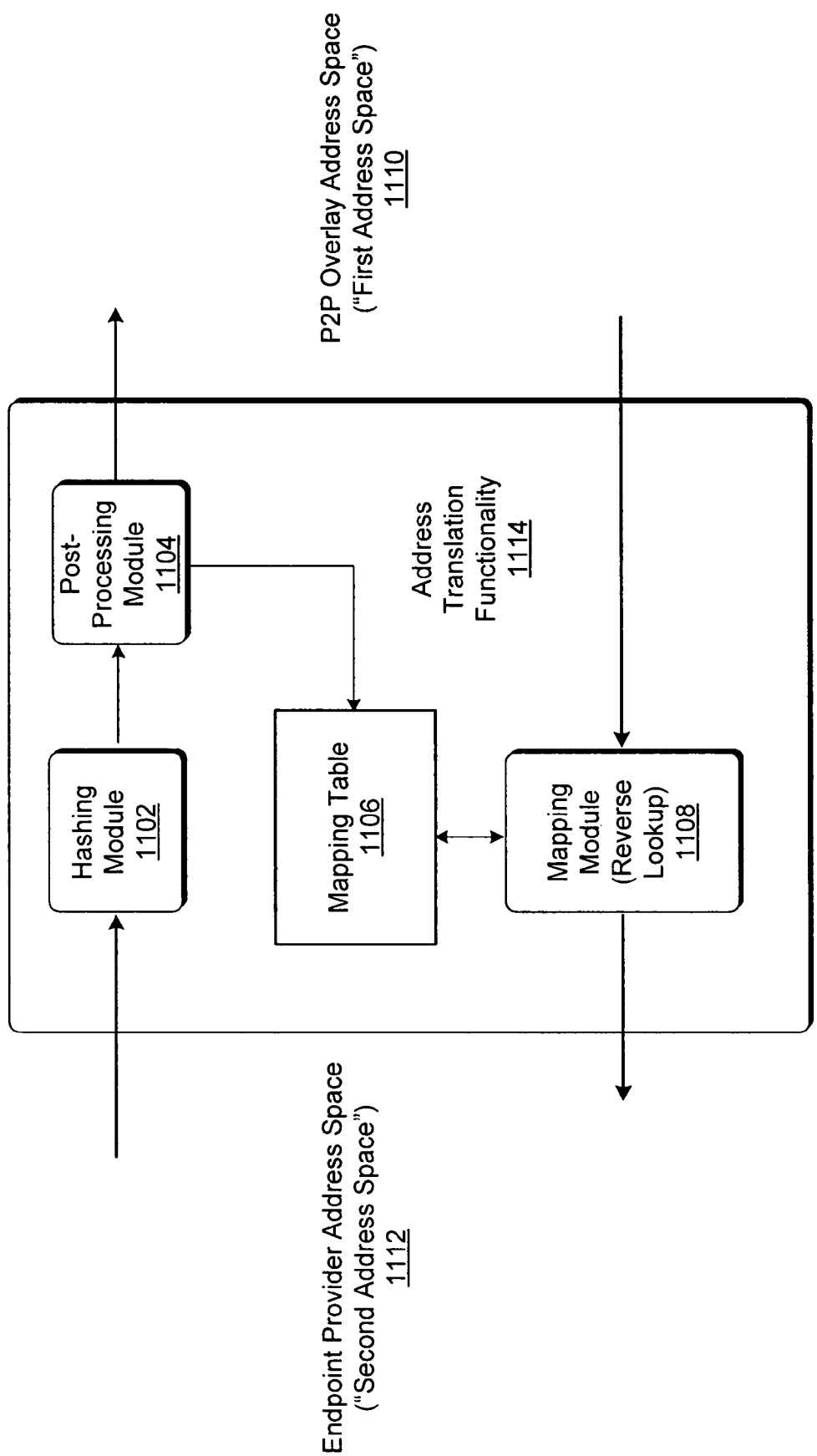
FIG. 11 illustrates an exemplary address translator (ATF) for use in translating address information between an PPOF and an EPPF.

FIG. 11 may provides additional information regarding the address translation functionality (ATF) 1114 introduced in the context of FIG. 3. Recall that the purpose of the ATF 1114 may be to translate between a PPOF address space 1110 used by the PPOF and an EPPF address space 1112 used by the EPPF. There are many possible implementations of the PPOF and EPPF address spaces (1110, 1112). According to one exemplary implementation, the PPOF address space 1110 may identify address information using IPv6-compatible addresses and the EPPF address space 1112 may identify address information using user name addresses (such as Email addresses). In general, address information provides information that may be used to identify and locate a participant device (202-212) in the P2P system. Recall that the address information expressed in different address spaces may ultimately target the same participant, but using a different format for expressing the address information.

In the above-identified exemplary implementation, the ATF 1114 may include a hashing module 1102 for hashing address information expressed in the EPPF address space 1112 (corresponding to, for example, user name address information). Any hashing algorithm may be used to implement the hashing module 1102, such as the known SHA1 algorithm. The SHA1 algorithm produces a 20-byte hash result.

A post-processing module 1104 receives the hash result and may perform various optional transformations on the hash result. For example, the post-processing module 1104 may modify the number of bits in the hash result, such as by removing bits from the hash result so that it conforms to the expectations of the PPOF address space 1110. For example, IPv6 addresses may be 16 bytes, so the post-processing module 1104 may remove 4 bytes of the hash result to yield a 16-byte address. Depending on the hash module being used, the post-processing module 1104 may also possibly add bits to provide a proper address in the PPOF address space 1110, or perform some other transformation of the hash result.

Further, the post-processing module 1104 may optionally pre-pend a special prefix to the hash result (or modify it in other ways) to ensure that the address information that it identifies does not correspond to a valid address in some other unintended address space. For example, one possibility may be that a node in the graph receives a hashed IPv6-like address from the ATF 1114 of the EPPF, but then inappropriately accesses another EPPF to form the actual connection. If that other EPPF uses IPv6, then there might be some risk, albeit remote, that the IPv6-like address created through hashing may identify a pre-existing entity in the "real" IPv6 space. Pre-pending a special reserved prefix to the hash result may fix this problem. An entity that receives an address such an IPv6 address may interpret the prefix as indicating that the address really corresponds to an entity in the messenger-related address space (for example). The output of the post-processing module 1104 may address information in the PPOF address space 1110.

The ATF 1114 may also include a mapping table 1106. The mapping table 1106 may store address information processed by the hashing module 1102. More specifically, for the above-described scenario, the mapping table 1106 may store the original address information in the EPPF address space 1112 (e.g., the user name address information) as well as the transformed address information in the PPOF address space 1110.

More specifically, the mapping table 1106 may stores this pair of address information such that its original form and translated form are associated with each other, such that one may be retrieved based on the other.

The mapping table 1106 may be populated when a participant first logs into the 1M service. That is, when a participant PPOF logs onto the IM service, the ATF 1114 may retrieve all of the contacts in the participant's contact list. These contacts may identify people with whom the participant communicates using the IM service. The ATF 1114 may hash all the user names in the contact list to IPv6-compatible address information, and then stores the results (in correspondence with the original user names) in the mapping table 1106.

The ATF 1114 may also include a mapping module 1108. The purpose of the mapping module 1108 may be to use the mapping table 1106 to convert address information in the PPOF address space 1110 to address information in the EPPF address space 1112. It may perform this operation by using the address information in the PPOF address space 1110 (e.g., the IPv6 address information) as a key to lookup the corresponding address information in the mapping table 1106 expressed in the EPPF address space 1112 (e.g., the user name address information).

In use, messenger-related functionality may communicate address information to the PPOF 300 by tasking the ATF 1114 to hash the user name address information to produce IPv6-like address information, and forwarding the transformed IPv6-like address information to the PPOF 300. The PPOF 300 may communicate address information to the EPPF by tasking the ATF 1114 to convert the IPv6-like address information to its corresponding user name counterpart (determined by consulting the mapping table 1106).

As a note, the ATF 1114 was described in the specific context of the PPOF 300 within an IM service. However, the ATF 1114 may be used in any environment where it is appropriate to translate between the address space used by one system and the address space used by another system.

Example of ATF Operation

Figure 12:
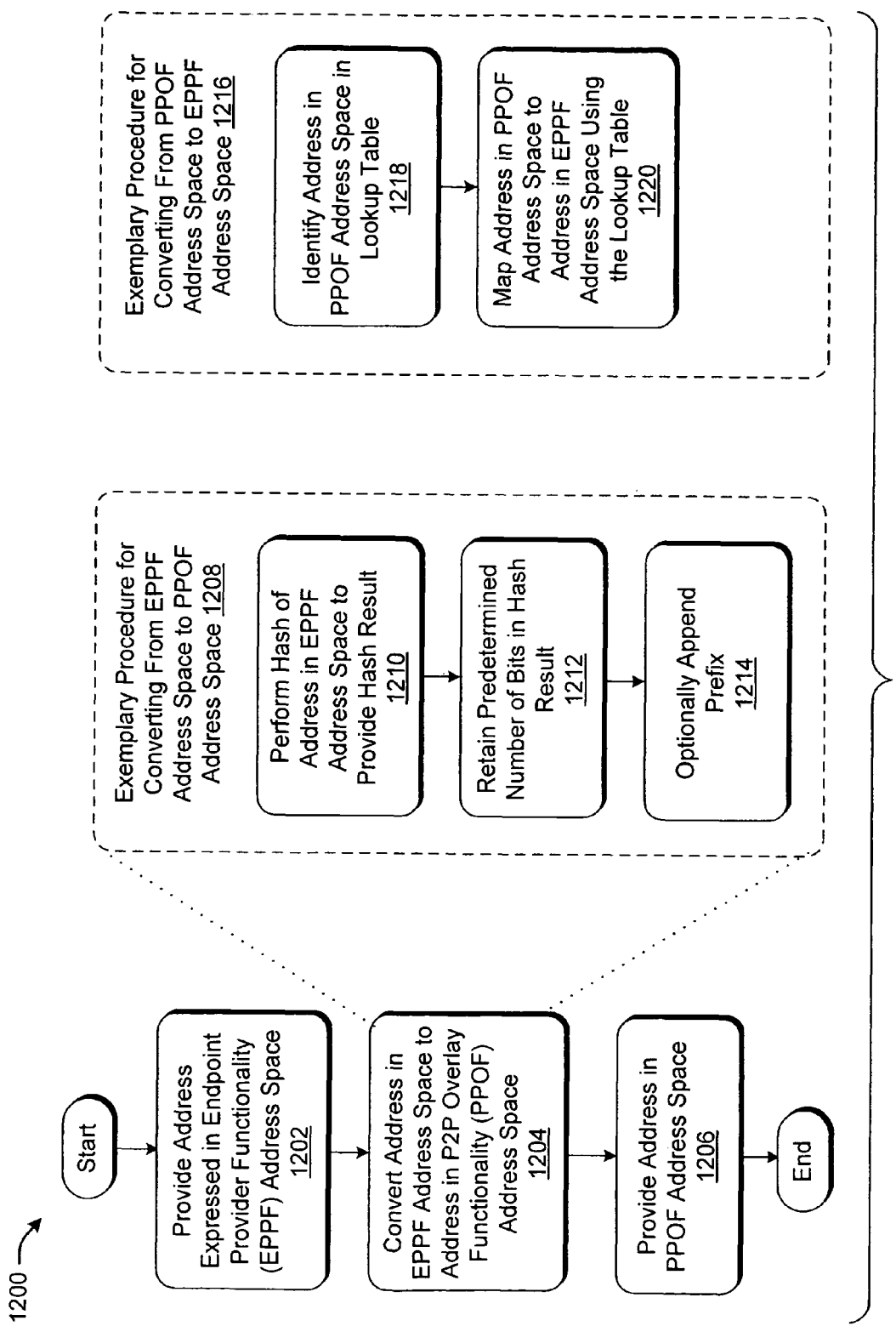
FIG. 12 illustrates a procedure that illustrates the operation of the address translator of FIG. 11.

FIG. 12 illustrates a procedure 1200 that illustrates the operation of the ATF described in FIGS. 5, 6, and 11. Reference to "address spaces" pertains to the address spaces (516, 518, 612, 614) and may be defined in the context of FIGS. 5 and 6.

In block 1202, the communication functionality may provide address information expressed in the EPPF address space (e.g., a name-compatible address space). In block 1204, the ATF may convert the address information expressed in the EPPF address space to address information expressed in the PPOF address space (e.g., an IPv6-compatible address space). In block 1206, the communication functionality may provide the thus-produced address information in the PPOF address space.

Subprocedure 1208 may provide more details regarding the operation of the translation operation of block 1204. In block 1210, the ATF 1114 may perform a hash of the address information in the EPPF address space to provide a hash result. In block 1212, the ATF may optionally retain a predetermined number of bits in the hash result (such as 16 bytes out of a 20 byte hash result produced by the SHA1 hash algorithm). (More generally, block 1212 may involve modifying the hash result in any appropriate way, not necessarily truncating it.) In block 1214, the ATF may optionally prepend a prefix code (or otherwise modifies the hash result) so that it does not yield address information which defines a valid address in some other unrelated and unintended address space.

Subprocedure 1216 may provide details regarding a manner in which the ATF may convert the address information from the PPOF address space back to the EPPF address space. Namely, in block 1218, the communication functionality may identify an address in the PPOF address space to be translated into an address in the EPPF address space. In block 1220, the ATF may perform the translation by using the address information in the PPOF address space as a key to identify corresponding address information in the EPPF address space within the mapping table 1106.

Transport Selection

As indicated above, different transport protocols may be appropriate for different respective links in the P2P system. The purpose of the transport selection strategy may be to select an appropriate transport protocol for coupling together two participant devices in the P2P system.

The transport strategy may employ selection functionality to weigh different criteria and to select the transport protocol that is best suited to implement a coupling between two participants. Exemplary criteria may include: (a) the bandwidth associated with different transport protocols; (b) the size of the information to be sent over the link; (c) various costs associated with the transport protocols; (d) various privacy consequences of the use of different transport protocols; (e) various user preferences with respect to the transport protocols; (f) whether there are any intermediary network devices (e.g., network address translators, firewalls, etc.) that have a bearing on the suitability of the transport protocols; (g) whether a particular transport protocol has failed between the participants on a prior occasion, and so forth. Selection may be performed by computing a single score for each transport protocol based on how well it satisfies the multiple criteria, and then choosing the transport protocol with the best score (e.g., the lowest or highest score).

The transport strategy may implement the above selection of an optimal transport protocol by exchanging various control messages between the two participants. In one message exchange protocol, a first participant device may inform a second participant device of the types of transport protocols that it may possibly use to communicate with the second participant device. The second participant device may then respond by selecting one transport protocol from the permitted list using the selection approach described above. The participant devices may then exchange whatever connectivity information is necessary to set up whatever transport protocol has been selected. The preliminary exchange of information may be carried out by a reliable channel available to all participants, although this channel might not be ultimately optimal for all connections.

After such exchange, the participant devices may then be used to carry out the exchange of information using the selected protocol. Upon failure of the selected transport protocol, the selection functionality described above may be again employed to select another transport protocol, this time omitting the failed transport protocol from the list of permissible transport protocols.

A benefit of the present invention may be that the use of an interface provides a design specification for third party developers to leverage the graphing functionality provided by a PPOF object without having to necessarily modify their application. Instead, an appropriate EPPF may be designed to plug into and use the PPOF. Additionally, EPPFs may be utilized by more than one application once a specific EPPF is developed for a particular transport protocol. The use of EPPFs may allow an existing PPOF to expand its graph beyond nodes that only use the PPOF native transport. Moreover, with the EPPF interface, any number of nodes may be added to the graph without having to redesign the PPOF functions. The PPOF object may only need to be modified to use an EPPF interface that may override or be used instead of the native transport. Furthermore, because the claimed system places the burden of address space translation on the EPPF, the PPOF may not need to recode any function parameters and modify any existing data structures. This also means that enhancements to the graphing overlay functionality may be made with minimal effect to the applications or nodes. For example, the flooding mechanisms may be improved or modified by making changes to the PPOF without affecting the applications or the EPPF.

What is claimed is:

1. A computer-readable storage medium having computer-executable instructions for performing operations comprising:

creating a first peer-to-peer functionality object that contains peer-to-peer network functions and peer-to-peer transport functions using a first address space, wherein the peer-to-peer functionality object is enabled to communicate using a first transport protocol with a first node of a peer-to-peer network, the peer-to-peer network represented in the peer-to-peer functionality object by a logical graph, the logical graph managed by the peer-to-peer functionality object, including a plurality of nodes, and defining an interconnection structure that logically describes the connections between the plurality of nodes in the peer-to-peer network;

creating an endpoint provider object that communicates using a second transport protocol with a second node of the logical graph; and connecting the first peer-to-peer functionality object to the endpoint provider object using an endpoint provider interface, wherein:

the first and second nodes are peers in a serverless communication architecture, a multiparty communication application calls the first-peer-to-peer functionality object, the peer-to-peer functionality object is operable to direct a transport function request to the endpoint provider interface, the endpoint provider interface is operable to direct the transport function request to the endpoint provider object, the endpoint provider object executes the transport function request such that the endpoint provider interface and the endpoint provider object cooperate to enable communication between the first peer-to-peer functionality object and the second node to facilitate the exchange of information among the nodes in the logical graph, the first node is directly connected to the first peer-to-peer functionality object and is enabled to communicate with the second node using a connection between the first peer-to-peer functionality object and the endpoint provider object, the first application executes a flooding function of the first peer-to-peer functionality object to send a message to the second application, and the endpoint provider interface provides the first peer-to-peer functionality object with a list of pointers to functions of the endpoint provider object.

2. The computer-readable storage medium of claim 1, wherein the first node represents a first application instance running on a first computer and the second node represents a second application instance running on a second computer.

3. The computer-readable storage medium of claim 1, further comprising creating a second peer-to-peer functionality object that communicates with the first peer-to-peer functionality object using the first transport protocol and wherein the first node is directly connected to the second peer-to-peer functionality object.

4. The computer-readable storage medium of claim 1, wherein the connecting comprises calling a Create Peer Graph function of the interface, which creates an instance of a peer graph and associates the endpoint provider object with the peer graph.

5. The computer-readable storage medium of claim 1, wherein the functions of the endpoint provider object comprise one of an initialization function, a shutdown function, a listen function, a stop listening function, a get listen information function, a create connection function, a close connection function, a send message function, a get connection information function, a local address check function, and a get free memory function.

* * * * *